United States Patent [19]

Minalga

[11] 4,159,002
[45] Jun. 26, 1979

[54] SEWING MACHINE INPUT SIGNAL WAVESHAPING

[75] Inventor: Philip F. Minalga, Piscataway, N.J.

[73] Assignee: The Singer Company, New York, N.Y.

[21] Appl. No.: 929,878

[22] Filed: Jul. 31, 1978

[51] Int. Cl.² .............................................. D05B 3/02
[52] U.S. Cl. ................................. 112/158 E; 318/397
[58] Field of Search .......... 112/158 E, 121.11, 121.12; 318/397

[56] References Cited

U.S. PATENT DOCUMENTS

| 3,859,581 | 1/1975 | Gardner | 318/397 |
| 4,016,821 | 4/1977 | Minalga | 112/158 E |

Primary Examiner—Peter Nerbun
Attorney, Agent, or Firm—Edward P. Schmidt; Robert E. Smith; Edward L. Bell

[57] ABSTRACT

In an electronically controlled sewing machine, new stitch position coordinate information is retrieved from a solid state memory and transferred to the sewing machine servo system one bit per some proportional clock period, at either a fast stepping rate or a slow stepping rate depending upon the speed of the sewing machine. By use of suitable logic gates, a low speed condition will initiate a slow stepping rate of some fraction of a predetermined clock period, whereas a high speed condition will initiate a fast stepping rate of once every clock period. The new data from the solid state memory is fed to a comparator wherein it is compared to the immediately prior stitch position coordinate information transferred to the servo system and retained in an up/down counter. The comparator determines whether the new data requires an up or a down count of the counter. The signal from the up/down counter is transferred to a pulse width modulator, the output of which is fed to a digital to analog converter for the appropriate bight or feed servo system of the sewing machine. In effect, the pulse width modulated signal transferred to the servo system is a ramp signal of steep or shallow slope dependent on whether the sewing machine is operating above or below a predetermined speed.

4 Claims, 4 Drawing Figures

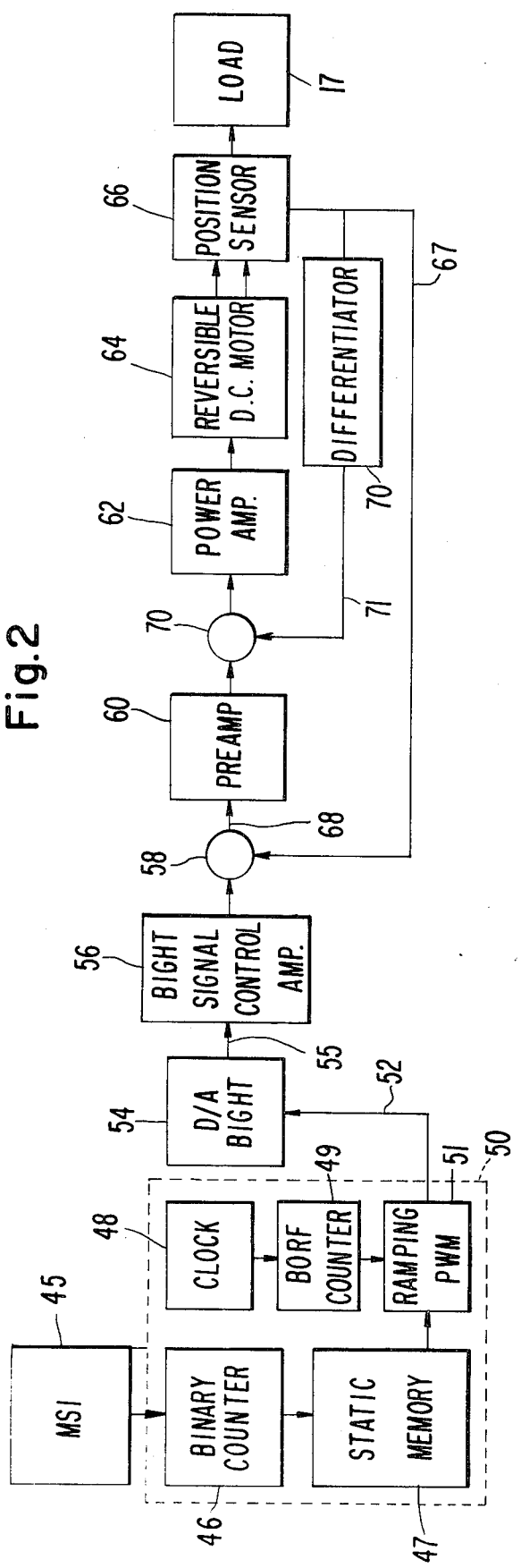
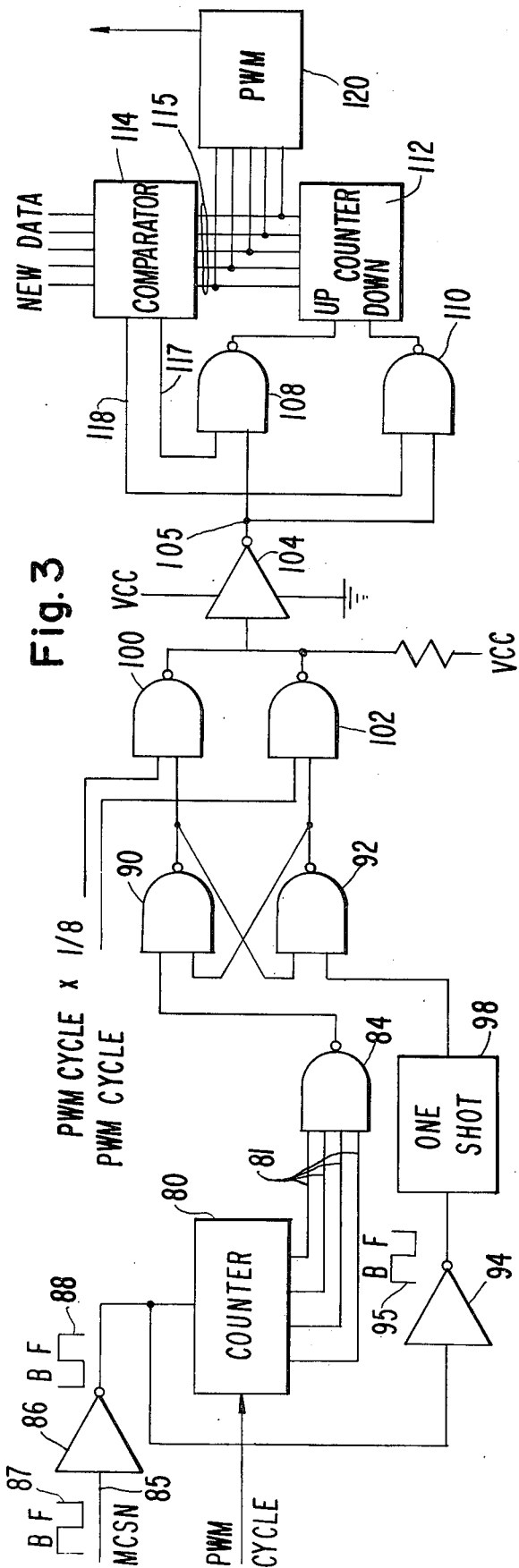

SEWING MACHINE INPUT SIGNAL WAVESHAPING

BACKGROUND OF THE INVENTION

This invention pertains to the field of sewing machines, more particularly, to electronic controls for positioning sewing instrumentalities thereof.

In prior art electronically controlled sewing machines, the stitch position information is retained in a solid state memory, and release of bight and feed digital information therefrom is signalled by a machine synchronizer input at the appropriate times during each revolution of the horizontal arm shaft of the sewing machine. The information thus released is transferred to digital to analog converters, and the resulting analog signals are fed to servo systems to urge the sewing instrumentalities to the new positions related to the digital information. Thus, information may be retained in the solid state memory indicative of the extreme right hand position for a needle bar of the sewing machine, and the immediately subsequent stitch may request the needle bar to move to extreme left hand position. The positioning of the needle bar itself may be accomplished by a linear motor deriving its driving signal from the servo system connected to the digital to analog converter. The linear motor of the servo system is required to reposition the needle bar from one extreme position to the other extreme position in the approximately one-half revolution when the sewing needle attached to the needle bar has been elevated out of contact with the work material. For a sewing machine operating at 1200 RPM, it can be calculated that the linear motor is required to accomplish its objective in approximately 20 milliseconds. By proper design of the linear motor and the servo system, the maximum linear motor excursion time of approximately 20 milliseconds can be assured. However, at lower sewing machine speeds the impact sound of the linear motor can be more easily heard due to the relatively quiet running of the sewing machine. What is required is some means of reducing the acceleration of the linear motor, when possible, which would tend to reduce the impact forces in the mechanism and thereby quiet the sound during excursion. It is, of course, more desirable to reduce the acceleration of the linear motors to a greater degree at the lower speeds of the sewing machine, in as much as the impact noise of the linear motor is a greater proportion of the overall noise of the sewing machine at these lower speeds.

SUMMARY OF THE INVENTION

The above requirements are met in the invention in which the new positional information is fed to the linear motor one bit at a time, instead of all at once. Two stepping rates are provided, one for slow speed operation of the sewing machine and one for high speed operation of the sewing machine when the impact noise from the linear motor is masked by the other noise of the sewing machine. During fast stepping, the data to the linear motor is changed one bit during every output cycle of data from the solid state memory, which cycle repeats approximately every 160 microseconds, based upon a 200 kilohertz clock frequency and 32 clock periods per cycle. During slow stepping, the data is changed one bit every eighth cycle, or every 1,280 microseconds. A speed of the sewing machine is chosen below which slow stepping must take place in order to reduce the impact noise of the linear motor below that point at which it would become obtrusive. Thus at or less than approximately 411 RPM, slow stepping will take place. As is usual in the heretofore known electronically controlled sewing machines, a machine synchronizer input is provided to signal the release of bight information from the solid state memory, and after approximately half of the stitch cycle to release feed information therefrom. Two counters are provided, one of which is cleared, started and stopped by the signal to release bight information and the signal to release feed information and the other of which is vice versa. These counters count the number of data cycles which would come from the solid state memory between signal pulses from the machine synchronization input. Since the 160 microsecond cycle time is constant, the number of cycles between signal pulses may be used to establish whether or not a fixed machine speed has been exceeded. Thus, if the counter fills up prior to clearing by the machine synchronizer input, the sewing machine is operating below the minimum speed at which fast stepping shall be initiated. By suitable logic circuitry, a suitable stepping rate may be established. Once the stepping rate has been established, other logic circuitry may be provided which in conjunction with a comparator comparing the new stitch data to the just prior stitch data, will establish whether the just prior data will be up or down counted and at what rate. Thus, the old data may be altered stepwise at the proper rate until that point is reached at which it is identical to the new data.

BRIEF DESCRIPTION OF THE DRAWINGS

In order that the invention may be more fully understood, it will now be described, by way of example, with reference to the accompanying drawings in which:

FIG. 2 is a general schematic block diagram of the bight portion of a system according to the present invention;

FIG. 3 is a schematic block diagram of a portion of the block diagram of FIG. 2, showing how the stepping rate may be determined and the ramping implemented in accordance with the stepping rate; and, FIG. 4 is a block diagram similar to FIG. 3 indicating generally how the ramping may be implemented in a LSI integrated circuit.

DESCRIPTION OF THE INVENTION

Figure 1:
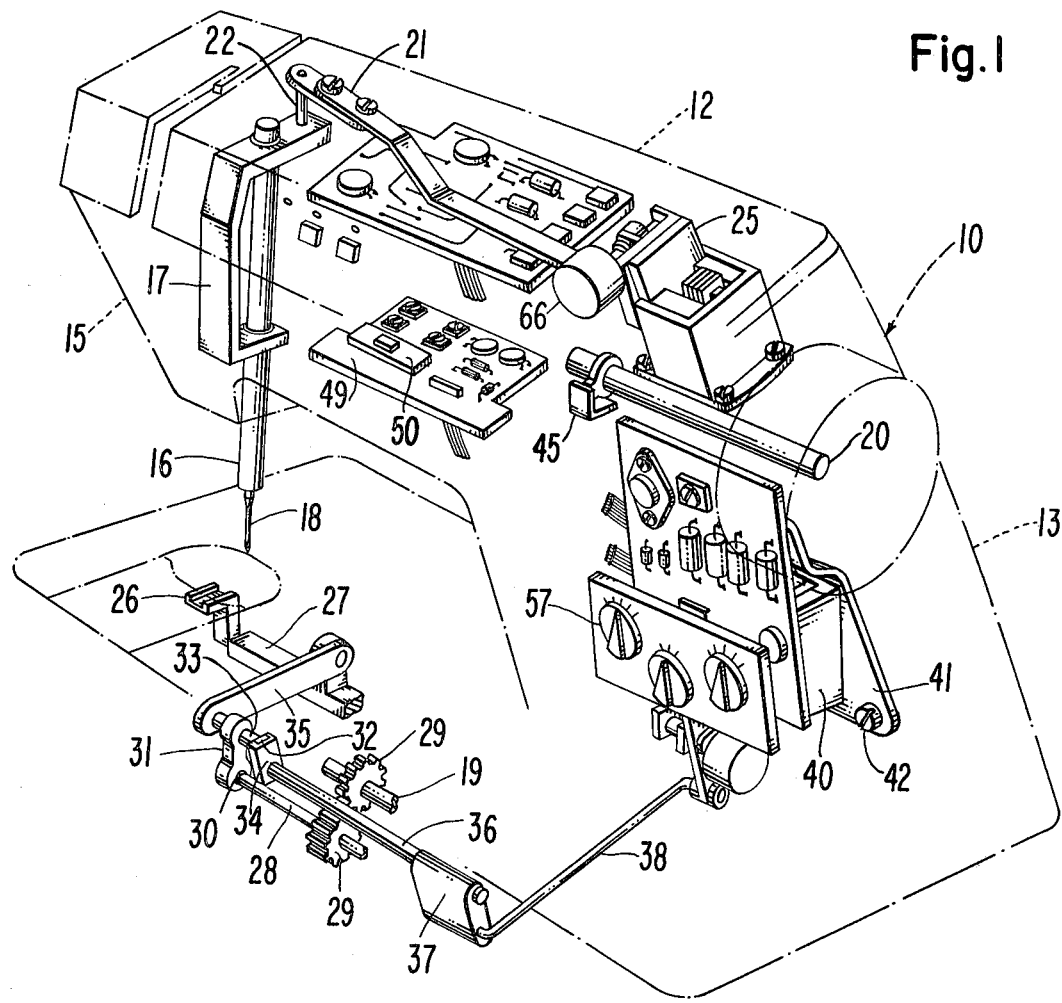
FIG. 1 is a perspective view of a sewing machine in which the invention may be utilized.

Referring to FIG. 1, there is shown in phantom a sewing machine casing 10 including a bed 11 and a bracket arm 12 supported in overhanging relation to the bed by a standard 13. The bracket arm 12 terminates in a head portion 15, within which is supported in a conventional manner, a needle bar gate 17 which supports for endwise recirprocation therein a needle bar 16. The needle bar 16 is caused to undergo endwise reciprocation by an arm shaft 20 by any conventional connection (not shown). The needle bar 16 carries in its extremity a needle 18 which cooperates with sewing instrumentalities (not shown) in bed 11 in the formation of sewing stitches.

The needle bar gate 17 is urged to impart lateral jogging motion to the needle bar 16 by a driving arm 21 pivotably connected to the needle bar gate by pin 22. The driving arm 21 is connected to a reversible linear actuator 25 fully described and explained in the U.S. Pat. No. 3,984,745 issued on Oct. 5, 1976, and assigned to the same assignee as the present invention, which is incorporated by reference herein. The linear actuator 25 is therefore used to determine lateral position of the sewing needle 18.

Also illustrated in FIG. 1 is a fragment of a work feed mechanism including a feed dog 26 carried by a feed bar 27. The mechanism illustrated for imparting work transporting movement to the feed dog includes a feed drive shaft 28 driven by gears 29 from a bed shaft 19, which is interconnected with the arm shaft 20 in time relationship by a conventional mechinsm (not shown). A cam 30 embraced by a pitman 31 is connected to a slide block 32, by pin 33, to reciprocate the slide block in a slotted feed regulating guideway 34. The pin 33 is also pivotally connected to a horizontal link 35 which is itself pivotally connected to the feed bar 27. Thus, for a given inclination of the guideway 34, a predictable horizontal motion of the slide block ensues and is transferred to the feed dog 26 by the horizontal link 35 and feed bar 27.

The inclination of the feed regulating guideway 34 may be adjusted by rotation of shaft 36 affixed to the guideway. The shaft 36 has a rock arm 37 affixed to the opposite extremity thereof, which rock arm is connected by a rod 38 to a second reversible linear actuator 40 supported by support bracket 41 suitably attached to the sewing machine casing 10 by screws 42, only one of which is visible. Thus, the linear actuator 40 is utilized to determine the feed rate of the sewing machine.

Referring to FIG. 2, there is depicted a general schematic block diagram for the bight controlling portion of the sewing machine only. The block diagram for feed control would be similar, except for minor differences related to operator control for feed. The pattern information required to drive the linear actuators 25 and 40 originates preferably in an integrated circuit (IC) 50 (see also FIG. 1). It will be noted that the IC 50 incorporates many distinct components, including a memory section 47, and may be implemented by more than one chip. A method by which the proper pattern information may be extracted from the IC 50 to be presented to the respective digital to analog converters for bight or feed is disclosed in U.S. Pat. No. 3,855,956, assigned to the same assignee as the present invention, which is hereby incorporated by reference herein. In that patent, a system is disclosed wherein digital information related to the positional coordinates for each stitch of a predetermined stitch pattern is stored in the static memory 47 in the IC 50. A machine synchronizer input (MSI) 45 (see also FIG. 1) driven in timed relation with the sewing machine produces timing signal pulses during each stitch. Certain of these signal pulses are counted up in a counter 46 to provide a time series of progressively increasing binary numbers corresponding to the progressively increasing number of stitches in the pattern. Counter 46 may be included as part of the IC 50. The output of the counter 46 is supplied as the address to the static memory 47, to recover as output therefrom the digital information related to the positional coordinates for each stitch of the predetermined pattern. The output from the IC 50 is applied, ultimately, to control driving devices operatively connected to impart a control range of movement to the needle and feed of the sewing machine to produce specific predetermined position coordinates for the needle penetration during each stitch formation.

It will be apparent to those skilled in the art, that there are other methods for extracting the proper information from the static memory 47. For example, a shift register may be used, in conjunction with hard wired logic, to provide an address for a static memory 47 in a predetermined sequence, which address changes for each machine synchronization signal. This type of data extraction system may be more susceptible of incorporation into a Large Scale Integration (LSI).

Thus in FIG. 2, the pulses from the machine synchronizer input 45 are counted up in counter 46 and presented as address inputs to the static memory 47 in the IC 50. The IC 50 may be as shown in FIG. 1, mounted on logic printed circuit board 49. The IC 50, presents as output in pulse width modulated form, digital information related to the positional coordinates for each stitch. The purpose of the ramping width modulator (PWM) 51, as will be explained below, is to change the information presented to the sewing machine servo systems one bit over a proportional clock period so as to reduce or eliminate impact noises generated by the linear actuators 25, 40.

In the preferred form of the invention, the machine synchronizer input 45 is implemented by a Hall Effect sensor having, in one revolution of the arm shaft 20, two stable states of approximately 180° each. The change from one stable state to the other and vice versa signals the release of bight information and feed information, respectively, from the static memory 47 of the IC 50. The transition from one of the stable states to the other may also be used to increase the address count in the counter 46. The bight pulse width modulated signal is presented along line 52 to the digital to analog converter 54. The analog signal from the D/A converter 54 outputs on line 55 to a bight signal control amplifier 56. The bight signal control amplifier 56 may include a gain control 57, visible in FIG. 1, for the purpose of adjusting the signal obtained from the IC 50 to the needs of the sewing operator. The output of the bight signal control amplifier 56 passes through the summing point 58 of a low level preamplifier 60 of the bight servo amplifier system. The low level preamplifier 60 drives a power amplifier 62 which supplies direct current of reverse plurality to the electromechanical actuator 64, which in the broadest sense comprises a reversible motor, to position the actuator in accordance with the input analog voltage on line 55. A feed back position sensor 66 (see also FIG. 1) mechanically connected to the reversible motor 64 provides a feedback position signal on line 67 indicative of the existing output position. The input analog voltage and the feedback signal are algebratically summed at the summing point 58 to supply an error signal on line 68. The feedback signal from the position sensor 66 is also differentiated with respect to time in a differentiator 70, and the resulting rate signal is presenting on line 71 to the summing point 72 of the power amplifier 62 to modify the positional signal at that point. The position sensor 66 may be any device that generates an analog voltage proportional to position and may, in this embodiment, be a simple linear potentiometer connected to a stable reference voltage and functioning as a voltage divider. The differentiator 70 is preferably an operational amplifier connected to produce an output signal equal to the time rate of change of the input voltage as is well known in this art. In FIG. 2, which indicates the operation of the bight control of the sewing machine, the load is the needle bar gate 17 and is so enumerated. For the corresponding feed circuit the load would be the feed regulator guideway 34, which is positioned by the linear motor 40 through the rod 38, rock arm 37 and shaft 36.

Referring now to FIG. 3 there is shown in greater detail those parts of the IC 50 which are used to release pattern information one bit per some proportional clock period to the bight digital to analog converter 54. A similar circuit would be provided for feed. As stated above bight or feed information is released from the IC 50 in pulse width modulator form on a change of the machine synchronizer input 45 from one stable state to the other. The data from the IC 50 will be repeated approximately every 160 microseconds, based on a 200 kilohertz clock frequency and a data pulse train of 32 clock periods. This periodic data released from the IC 50 is known as the pulse width modulated cycle and by virtue of the 200 kilohertz clock frequency, is a constant cycle. The machine synchronizer input 45 generates machine synchronization signals which are directly related to the speed of operation of the sewing machine. Thus, the change in time between successive bight and feed requests, or the change in time between successive feed and bight requests, is directly related to the speed of the sewing machine. Utilizing the change in time between feed and bight requests of the machine synchronizer input 45 will provide the most current indication of speed variation of the sewing machine during the bight request, and vice versa. When the sewing machine is operating at high speed there will be a relatively high noise level emanating from the main drive motor and other mechanical parts of the sewing machine. Under these conditions, the noise of the linear actuators 25, 40 becomes a small portion of the total noise level and, accordingly, less care is required to mask the impact noise of the linear actuators 25, 40. However, at low speed, when the main drive motor of the sewing machine is operating relatively quietly, as are the other mechanical parts thereof, the noise output of the linear actuators 25, 40 becomes appreciable with respect to the total noise level and impact noises are discernible. In order to avoid these impact noises, some means must be provided to limit the acceleration of the linear motor to a rate which will permit extreme excursion thereof to take place in the allotted time, but with substantially less impact noise. The speed of the sewing machine below which the acceleration of the linear motors 25, 40 must be controlled may be determined empirically. For the specific embodiment in which the invention is utilized, this speed was determined to be approximately 411 stitches per minute. Thus it was determined that changes in the machine synchronization of less than 73 milliseconds between the bight and feed request should result in fast stepping since this would indicate that the sewing machine is operating at greater than 411 stitches per minute. When the sewing machine operates at less than 411 stitches per minute, slow stepping may take place. In fast stepping, the data transferred from the IC 50 to the digital to analog converter 54 is changed one bit for each cycle of the pulse width modulated signal. Thus, the data changes one bit every 160 microseconds. For a maximum sewing machine speed of 1200 RPM, each revolution take place in 50 milliseconds. Since motion of the needle bar gate 17 and the sewing needle 18 can only take place when the sewing needle is removed from the work material, excursion from one extreme position to another must take place within approximately 20 milliseconds. A five bit digital code word is used each for bight and for feed, and there may be 32 possible discrete positions for the instrumentalities controlling the position of the needle bar 16 or the feed regulator guideway 34. Thus for a fast stepping rate of once each pulse width modulated cycle, or every 160 microseconds, data stepping from one extreme to the other takes in the order of 5 milliseconds. The effect is that at the fast stepping rate the data is more gradually applied to the linear actuators 25, 40 and peak acceleration of the actuators is substantially reduced, thereby also reducing the impact noise.

Below a sewing machine speed of 411 stitches per minute, a slow stepping is required which will substantially alleviate the impact noise while permitting the extreme excursions to take place in the allotted time. At 411 stitches per minute, a complete stitching cycle takes place in 146 milliseconds. At this speed the required excursion time for the linear actuators 25, 40 is in the order of 60 milliseconds. If stepping were to take place upon every eighth pulse width modulated train, the maximum 32 steps would take approximately 41 milliseconds. Therefore slow stepping can take place upon every eighth pulse width modulation train and leave ample time for the maximum excursion to take place.

In FIG. 3 are shown in detail the BORF (Bight or Feed) counter 49 and Ramping Pulse Width Modulator (PWM) 51 shown in FIG. 2 as part of the IC 50. Not shown in FIG. 3 but present in the IC 50 of FIG. 2 is the clock 48 which provides the pulse width modulation (PWM) cycle. The bight pulse width modulation cycle from the clock 48 is transferred to a counter 80. The counter 80 is arranged so that upon completion of 452 pulse width modulation cycles the lines 81 output highs to NAND 84. 452 pulse width modulation cycles take place in approximately 72 milliseconds. As explained above, the machine synchronization signal put out by the machine synchronizer input 45 provides for 73 milliseconds between bight and feed requests at the critical sewing machine speed of approximately 411 RPM. Thus, the machine synchronization input may be utilized to start and stop the counter 80, and at a sewing machine speed of less than 411 RPM, the counter will fill; whereas at speeds of greater than 411 RPM, the counter will not fill due to being stopped prior thereto. Thus the critical speed of the sewing machine 10 of FIG. 1 has been determined by comparing the fixed frequency of the pulse width modulation cycle to the machine synchronization pulses put out by the machine synchronizer input 45. If the counter 80 is cleared before all lines 81 go high, the sewing machine 10 is operating at greater than 411 RPM and the data from the IC 50 will be fast stepped. If the counter 80 is filled so that all lines 81 are high prior to clearing of the counter by the machine synchronization pulse, the sewing machine is operating slowly and slow stepping may take place where the data from the IC 50 is transferred to the servo signal one bit for every eighth pulse width modulation cycle.

The input waveform 87 to the inverter 86 represents the output of the machine's synchronizer input 45. Thus, a rise to the bight portion (B) of the pulse initiates the release of data from the static memory 47 to the bight servo amplifier system. The fall from the bight portion (B) to the feed portion (F) initiates release of feed data from the static memory 47 to the feed servo amplifier system. The inverter 86 converts the signal to the output waveform 88 where there is a rise from the bight pulse (B) to the feed pulse (F) which rise initiates the counting in the counter 80. At the end of the feed pulse (F), the pulse decays to the bight pulse (B), this decay signaling the counter 80 to terminate a count. It must be pointed out that the circuit shown in FIG. 3 specifically relates to the ramping of the bight pulse width modulation signal. The circuit used to obtain the ramping feed pulse with modulation signal will be substantially similar except that the corresponding counter 80' not shown for the feed circuit may be started and stopped by the rise and fall, respectively, of the bight pulse (B). In order to obtain the most recent period for determination of the stepping rate the number of pulse width modulation cycles is determined during the feed cycle just prior to that during which the ramping of the bight pulse width modulation signal will take place. Thus the inverter 86 is used to change the waveform from the machine synchronizer input 45 to that shown for the output waveform 88, so that the feed portion of the pulse may be utilized to initiate and terminate the count in the counter 80.

As noted above when the counter 80 fills the input on lines 81 to NAND 84 are high causing the output thereof on line 85 to be low. The output of the NAND 84 is presented as the set (S) input of a RS flipflop implemented by NAND 90, 92. An inverter 94 is provided to reinvert the output waveform 88 from the inverter 86 to that shown by the waveform 95, and a one shot 98 is provided which is responsive to the trailing edge of the bight pulse to release a reset pulse from the one shot to the reset terminal of NAND 92 of the RS flipflop. Thus, if the sewing machine is operating at less than 411 RPM as evidenced by the signal from the machine's synchronizer input 45 to the counter 80 through inverter 86, the counter will fill the input of the NAND 84 causing the output thereof to set the RS flipflop. If, on the other hand, the counter 80 is cleared by the feed pulse from the inverter 86 before the counter is filled, the input on lines 81 to the NAND 84 will not all be high and the output of the NAND 84 will be high, thereby maintaining the RS flipflop in the reset state.

Where the RS flipflop implemented by NANDS 90, 92 is set, the output from NAND 90 will be high, presenting a high input to the NAND 100. The second input to the NAND 100 is provided by the pulse width modulation cycle divided by eight (PWM cycle $\times \frac{1}{8}$). Thus, the NAND 100 with one input high, and the second input high every eight pulse width modulation cycle, provides a low output every eight pulse width modulation cycle, when both inputs are high. Also, when the RS flipflop implemented by NAND 90, 92 is set and the output of NAND 90 is high the complementary output of NAND 92 will be low. The low output on NAND 92 provides a low input to NAND 102 and maintains the output of the NAND 102 high. When the output of NAND 100 and NAND 102 is combined with inverter 104, point 105 will go high every eight pulse width modulation cycle. If, on the other hand, the RS flipflop implemented by NAND 90, 92 remains reset, the output from NAND 90 will remain low and provide an input to NAND 100 which will maintain the output thereof high. The output of NAND 92 will be high and provide one input to NAND 102 which together with a high every pulse width modulation cycle will cause the output of the NAND 102 to go low every pulse width modulation cycle, the net result of which will be high at point 105 every pulse width modulation cycle.

The circuit thus far described determines sewing machine speed by comparing the constant pulse width modulation cycle time to the variable sewing machine's synchronizer signal. Next, a ramp rate generator, implemented by NAND 90, 92, 100, 102 and inverter 104, utilize the speed determination to implement a slow or fast stepping ramp rate. Thus, at point 105, highs are presented at a frequency dependent upon the stepping rate determined to be necessary. The stepping rate at point 105 is utilized as one input to NAND 108 and 110. The outputs from the NAND 108, 110 are presented as up inputs and down inputs, respectively, for up/down counter 112. The up/down counter 112 is utilized to count up or down to the new stitch coordinate, in stepwise fashion, and to retain that count for comparison to new stitch coordinate data released from the static memory 47. The new stitch coordinate data released from the static memory 47 is transferred in parallel form to a comparator 114 which comparator is connected by lines 115 to the counter 112. If the new stitch coordinate data is greater than the count retained in the up/down counter 112, a pulse passes along line 117 to NAND 108, the output of which is connected to the upcount terminal of the counter 112 to cause an up increment of the counter according to the signal present at point 105, the second input of NAND 108. If the count retained in the counter 112 is smaller than the new stitch position coordinate data in the comparator 114, a signal passes along line 118 to the second input terminal of NAND 110. The output of NAND 110 is connected to the down count terminal of the counter 112 and implements a decrement of the count in the counter at the rate determined by the signal present at the point 105 which is the second input to NAND 110. The signal from the up/down counter 112, in addition to being transferred to the comparator 114, is also transferred to pulse width modulator 120. Thus, as the counter 112 is incremented or decremented stepwise according to the stepping rate signal present at point 105, the count is transferred to the pulse width modulator 120 which presents a signal changing according to the stepping rate. The pulse width modulator 120 is connected to the digital to analog converter for bight 54, and, as explained above, is used to drive the linear motor 25.

An identical circuit is utilized to obtain ramping of the feed pulse width modulation except that the output of the inverter 86 is put through a second inverter so as to have the corresponding counter 80' in the feed circuit (not shown) intiate the count at the start of the bight (B) portion of the machine synchronizer input signal, the count being terminated at the completion of bight synchronization signal. In this fashion, the counter 80' for the feed portion of the circuit will determine the stepping rate according to the speed of the sewing machine during the just prior bight portion of the cycle. With this one adjustment, the remaining portion of the feed circuit is identical to the bight circuit just described.

Figure 4:
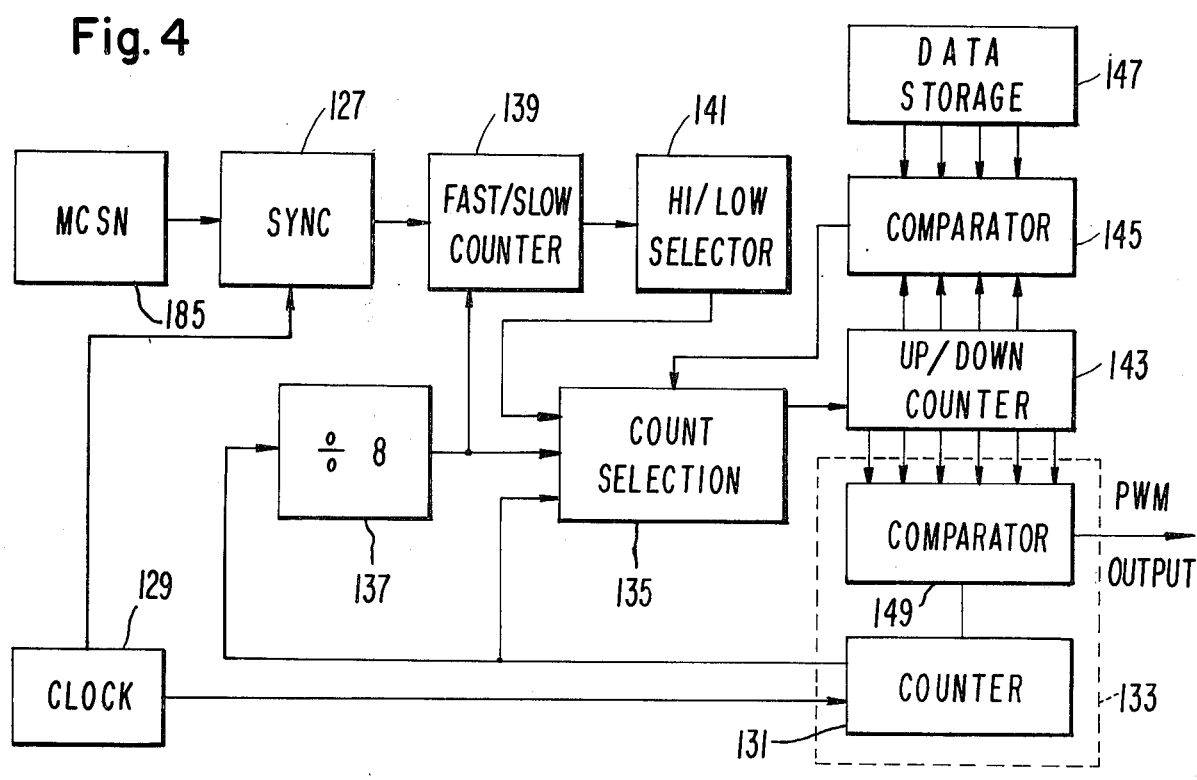

Referring now to FIG. 4, there is shown in block diagram form how the above described data stepping arrangement may be implemented in a Large Scale Integrated Circuit (LSI). The Machine Synchronization signal 185, provided by the machine synchronizer input 45, is itself synchronized by Synchronizer 127 to a 200 kilohertz system clock 129. The clock 129 provides the signal to a divide by 32($\div$32) counter 131 in Pulse Width Modulator (PMW) Logic 133. The counter 131 provides the pulse width modulation cycle which is 32 clock periods long. The pulse width modulation cycle is provided as input to a Count Selector 135, and to a divide by eight ($\div$8) counter 137. The $\div$8 counter 137 outputs a signal to the count selector 135 as well as to a fast/slow counter 139. The synchronizer 127 provides a signal from the machine synchronizer input 45, in synchronism with the system clock 129, to the fast/slow counter 139 as the second input thereto. In this arrangement the fast/slow counter 139 needs to count a fewer number of cycles between signals from the synchronizer 127 since the cycles counted are ½ the frequency of the pulse width modulation cycle. This response is determined by the state of the counter 139 at the time the output of the synchronizer 127 changes state. A high/low selector 141 is responsive to the count from the fast/slow counter 139 to set a high or a low stepping rate which is applied as an input to the count selector 135. The control signal put out by the high/low selector 141 determines which frequency cycle will be put out by the count selector 135 to up/down counter 143 and determines, therefore, at what frequency the up/down counter will change, one bit at a time. A comparator 145 is used, as in the previously described embodiment, to retain the new data from data storage 147 for comparison with the current count in the up/down counter 143, and to provide an input to the count selector 135 to enable an up count or a down count to the new data count, or to stop the counter at the new data count. The up/down counter 143 is connected to a comparator 149, part of the PMW Logic 133, which comparator in combination with the ÷32 counter 131 provides a pulse width modulated output signal which changes one bit per one of two clock periods, depending upon sewing machine speed.

In either of the embodiments disclosed above, it is not necessary that the machine synchronizer input 45 have two stable states of exactly 180° each since any duration for each stable state may be accommodated by suitable differences between counters 80 and 80' in the first embodiment described, and between fast/slow counter 139 for bight and 139' for feed in the second embodiment. It is also to be noted that the counters (80, 139) may also be arranged to be cleared, started and stopped once for each complete stitch cycle instead of for only that portion of the stitch cycle immediately preceding the portion for which a stepping rate is being determined. Thus, a stepping rate may be determined for each stitch cycle which will be utilized in the immediately following stitch cycle.

I claim:

1. A sewing machine having stitch forming instrumentalities positionally controlled over a predetermined range between stitches to produce a pattern of feed and bight controlled stitches; logic means for storing data and stitch information in digital form; means operating in time relation with the sewing machine for recovering selected digital pattern stitch information from said logic means; feed and bight digital to analog converter means for generating positional feed and bight analog signals, respectively, related to said selected digital pattern stitch information; and feed and bight closed loop servo means including reversible electric motors responsive to said feed and bight analog signals, respectively, for positioning said stitch forming instrumentalities to produce a pattern of stitches corresponding to the selected digital pattern stitch information, wherein the improvement comprises; means for determining whether the sewing machine is operating above or below a predetermined speed; means for establishing a high data stepping rate when the sewing machine is operating above said predetermined speed and a low data stepping rate when the sewing machine is operating below said predetermined speed; and, means for releasing said digital pattern stitch information to said feed and bight digital to analog converter means a bit at a time at the data stepping rate fixed by said establishing means.

2. A sewing machine as claimed in claim 1 wherein said logic means includes a clock and wherein said means for determining whether the sewing machine is operating above or below a predetermined speed is implemented by comparing said recovering means to said clock.

3. A sewing machine as claimed in claim 2 wherein said determining means includes a counter turned on and reset by signals from said recovering means while counting pulses derived from said clock, and wherein a low data stepping rate is indicated by a count above a predetermined level and a high data stepping rate is indicated by a count below said predetermined level.

4. A sewing machine as claimed in claim 1 or claim 3 wherein said establishing means includes a high rate clock having a pulse rate equal to said high data stepping rate, a low rate clock having a pulse rate equal to said low data stepping rate, and logic means for gating through the desired pulse rate from said high and low rate clocks according to information obtained from said determining means.

* * * * *